(12) United States Patent
Bennett, III et al.

(10) Patent No.: US 8,411,685 B1
(45) Date of Patent: Apr. 2, 2013

(54) MANAGING THE ALLOCATION OF INTERNET PROTOCOL ADDRESSES IN A WIRELESS NETWORK

(75) Inventors: John H. Bennett, III, Lawrence, KS (US); Frederick C. Rogers, Olathe, KS (US); Serge M. Manning, Overland Park, KS (US); C. Brent Hirschman, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 230 days.

(21) Appl. No.: 12/883,988

(22) Filed: Sep. 16, 2010

(51) Int. Cl.
*H04L 12/28* (2006.01)
*H04L 12/56* (2006.01)
(52) U.S. Cl. .......................................................... 370/392
(58) Field of Classification Search .................... 370/392
See application file for complete search history.

(56) References Cited

U.S. PATENT DOCUMENTS

| | | | | |
|---|---|---|---|---|
| 7,706,301 | B2* | 4/2010 | Petrescu et al. | 370/254 |
| 7,873,003 | B2* | 1/2011 | Baek et al. | 370/329 |
| 8,102,826 | B2* | 1/2012 | Lee | 370/338 |
| 2004/0177146 | A1* | 9/2004 | Ishiyama et al. | 709/226 |
| 2010/0284368 | A1* | 11/2010 | Haddad et al. | 370/331 |

OTHER PUBLICATIONS

D. Johnson et al., "Mobility Support in IPv6", RFC 3775, Jun. 2004.*

* cited by examiner

*Primary Examiner* — Ayaz Sheikh
*Assistant Examiner* — Blanche Wong

(57) ABSTRACT

Methods are described for managing the allocation of IPv6 addresses to mobile devices. More specifically, the network portions of IPv6 addresses are dynamically allocated to mobile devices by a home agent. In one embodiment, a request is received to allocate a network portion of an IPv6 address. It is determined whether a network portion is stored in a database in association with the mobile device. If so, that network portion is allocated to the mobile device so that the mobile device can establish a communication session. If not, the home agent is asked to allocate a network portion that is currently available.

18 Claims, 9 Drawing Sheets

MANAGING THE ALLOCATION OF INTERNET PROTOCOL ADDRESSES IN A WIRELESS NETWORK

SUMMARY

A high-level overview of various aspects of our technology are provided here for that reason, to provide an overview of the disclosure, and to introduce a selection of concepts that are further described below in the detailed-description section. This summary is not intended to identify key features or essential features of the claimed subject matter, nor is it intended to be used as an aid in isolation to determine the scope of the claimed subject matter.

In brief and at a high level, this disclosure describes, among other things, methods, systems, and computer-readable media for managing the allocation of IPv6 addresses, and in particular network portions of IPv6 addresses to mobile devices. To establish a communication session, an IPv6 address is requested from the network. In embodiments of the present invention, the allocation device, such as a home agent, is responsible for allocating network portions of IPv6 addresses to mobile devices. The allocation component is directed by the authentication component to allocate a currently-available network portion to the mobile device. The association between the mobile device and the network portion is cached in either the authentication component or a customer-profile database that stores user profiles.

BRIEF DESCRIPTION OF THE SEVERAL VIEWS OF THE DRAWINGS

Illustrative embodiments of the present invention are described in detail below with reference to the attached drawing figures, wherein.

DETAILED DESCRIPTION

Figure 1:
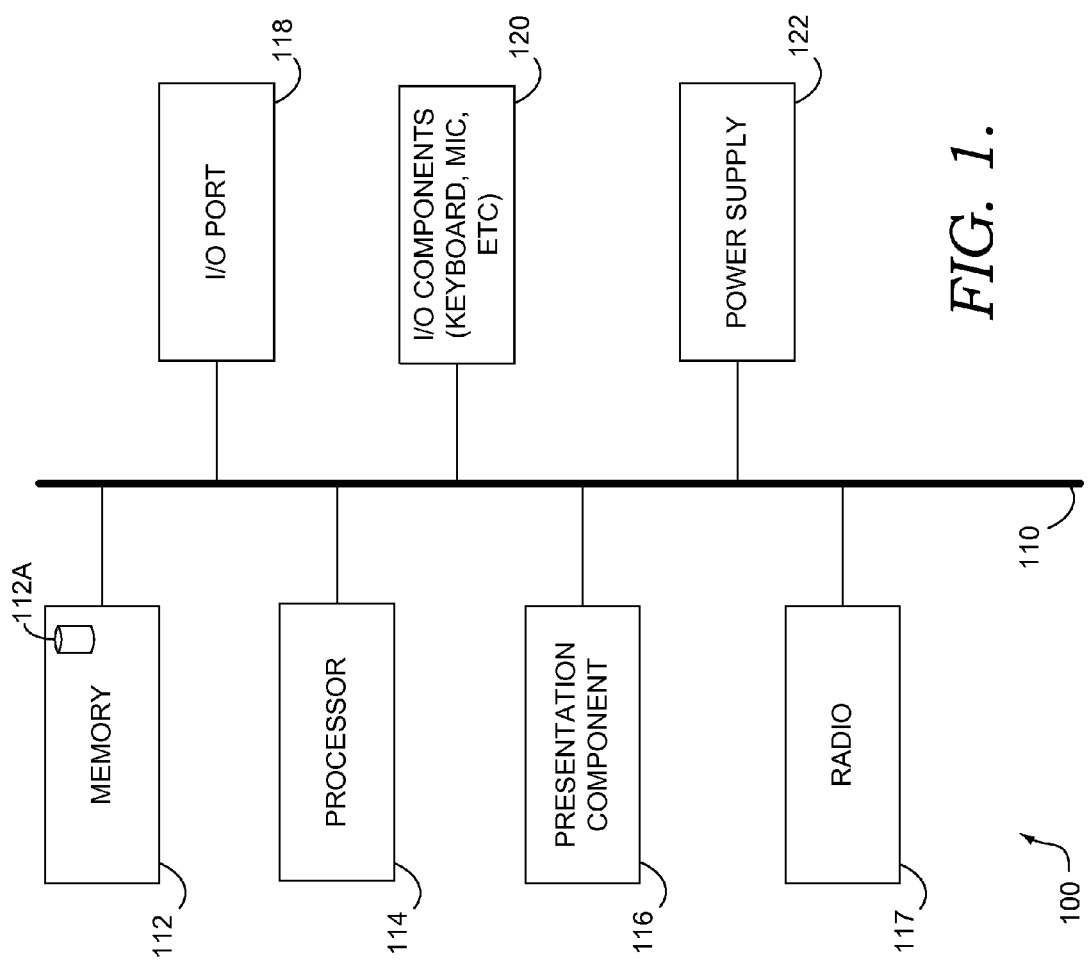
FIG. 1 depicts an illustrative device suitable for use in connection with an embodiment of the present invention.

The subject matter of the present invention is described with specificity herein to meet statutory requirements. However, the description itself is not intended to define the invention, which is what the claims do. Rather, the claimed subject matter might be embodied in other ways to include different steps or combinations of steps similar to the ones described in this document, in conjunction with other present or future technologies. Moreover, although the term "step" or other generic term might be used herein to connote different components or methods employed, the terms should not be interpreted as implying any particular order among or between various steps herein disclosed unless and except when the order of individual steps is explicitly described.

Throughout this disclosure, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| | |
|---|---|
| AAA | Authentication, Authorization, and Accounting |
| ASN | Access Service Network |
| BTS | Base Transceiver Station |
| CDMA | Code Division Multiple Access |
| DHCP | Dynamic Host Configuration Protocol |
| DNS | Domain Name System |
| eNB | E-UTRAN Node B |
| FA | Foreign Agent |
| GGSN | GPRS Gateway Support Node |
| GPRS | General Packet Radio Service |
| GSM | Global System for Mobile communications (Groupe Special Mobile) |
| HA | Home Agent |
| HSS | Home Subscriber Server |
| HTTP | Hypertext Transfer Protocol |
| IP | Internet Protocol |
| IPv6 | Internet Protocol Version Six |
| LED | Light Emitting Diode |
| LMA | Local Mobility Anchor |
| MAG | Mobile Access Gateway |
| MIP | Mobile IP |
| MME | Mobility Management Entity |
| PDA | Personal Data Assistant |
| PDSN | Packet Data Serving Node |
| P-GW | Packet Data Network Gateway |
| PPP | Point-to-Point Protocol |
| RNC | Radio Network Controller |
| SGS | NServing GPRS Support Node |
| S-GW | Serving Gateway |
| TDMA | Time Division Multiple Access |
| UMTS | Universal Mobile Telecommunications System |

Further, various technical terms are used throughout this description. An illustrative resource that fleshes out various aspects of these terms can be found in Newton's Telecom Dictionary, 25th Edition (2009).

Embodiments of the present invention can take the form of a method, system, or computer-readable media embodied with a specific set of computer-executable instructions. Computer-readable media include both volatile and nonvolatile media, removable and nonremovable media, and contemplate media readable by a database, a switch, and various other network and computing devices. Computer-readable media include media implemented in any method or technology that stores information. Examples of stored information include computer-useable instructions, data structures, program modules, and other data representations. Examples of computer-readable media include, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. The computer-readable media can store data momentarily, temporarily, or permanently.

As mentioned, embodiments of the present invention include methods, systems, and computer-readable media for allocating a currently-available network portion of an IPv6 address to a mobile device that is requesting from the network a communication session to be established. In embodiments of the present invention, the allocation component, such as a home agent (e.g., HA, MAG), allocates the IPv6 addresses instead of an authentication component, which may be an AAA server. The allocation component, in some embodiments, is better suited to allocate IPv6 addresses to mobile devices, as the allocation component is user and state aware such that is knows when a communication session is active, inactive, terminated, etc. Thus, the allocation component is better able to allocate IPv6 addresses by associating the IPv6 address with the mobile device, and better able to disassociate the IPv6 address with the mobile device when the communication session has been terminated. This allows for a more proactive approach to the management of allocating IPv6 addresses in that instead of waiting to disassociate the IPv6 address from the mobile device at the expiration of a timer that corresponds to the communication session, for instance, the allocation component is directed to disassociate the IPv6 address from the mobile device when the communication session terminates for any reason. Thus, at any given time, there are more available IPv6 addresses that can be allocated to other mobile devices.

In one aspect of the present invention, computer-readable media having computer-executable instructions embodied thereon that, when executed, facilitate a method for managing an allocation of Internet Protocol version six (IPv6) addresses to mobile devices. The method includes receiving at an allocation component a request to allocate a network portion of an IPv6 address to a mobile device, and determining whether a customer-profile database has stored the network portion of the IPv6 address in association with the mobile device. If the customer-profile database has stored the network portion of the IPv6 address, the method further includes communicating the network portion to the mobile device. If the customer-profile database does not have stored the network portion of the IPv6 address, the method additionally includes identifying an unused network portion to the mobile device, allocating the unused network portion to the mobile device, and communicating the unused network portion of the IPv6 address to the mobile device so that the mobile device can establish a communication session.

In a further aspect of the present invention, computer-readable media having computer-executable instructions embodied thereon that, when executed, facilitate another method for managing an allocation of Internet Protocol version six (IPv6) addresses to mobile devices. The method includes receiving an indication that a mobile device is requesting a network portion of an IPv6 address that enables the mobile device to communicate by way of a wireless communications network. At an allocation component, the method further includes receiving a request to assign the network portion of the IPv6 address that is currently unused to the mobile device and identifying an unused network portion to assign to the mobile device. Additionally, the method includes assigning, by the allocation component, the unused network portion to the mobile device and storing the unused network portion in a database. The unused network portion is stored in association with the mobile device. The method also includes communicating to the mobile device the unused network portion, thereby enabling the mobile device to communicate by way of the wireless communications network.

In another aspect of the present invention, computer-readable media having computer-executable instructions embodied thereon that, when executed, facilitate another method for managing an allocation of Internet Protocol version six (IPv6) addresses to mobile devices. The method includes receiving a request to allocate a network portion of an IPv6 address to a mobile device that has requested an establishment of a communication session. The request indicates that the network portion is not stored in a customer-profile database in association with the mobile device. Additionally, the method includes identifying a currently-available network portion. At a home agent that is associated with the mobile device, a currently-available network portion is allocated to the mobile device and is communicated to the mobile device. The currently-available network portion allocated to the mobile device is unique to the mobile device. Further, the method includes receiving an indication that the communication session has been terminated, and indicating that the network portion allocated to the mobile device is available for use by another mobile device.

Turning now to FIG. 1, a block diagram of an illustrative mobile computing device ("mobile device") is provided and referenced generally by the numeral 100. Although some components are shown in the singular, they may be plural. For example, mobile device 100 might include multiple processors or multiple radios, etc. A mobile device may be one of many devices, including, but not limited to, a mobile phone, a laptop, a PDA, a handheld device, etc. As illustratively shown, mobile device 100 includes a bus 110 that directly or indirectly couples various components together including memory 112, a processor 114, a presentation component 116, a radio 117, input/output ports 118, input/output components 120, and a power supply 122.

We previously have described various memory components that memory 112 might take the form of. Thus, we will not elaborate more here, only to say that memory component 112 can include any type of medium that is capable of storing information (e.g., a datastore 112A). Processor 114 might actually be multiple processors that receive instructions and process them accordingly. Presentation component 116 includes the likes of a display, a speaker, as well as other components that can present information (such as a lamp (LED), or even lighted keyboards).

Radio 117 is a radio that facilitates communication with a wireless telecommunications network. Illustrative wireless telecommunications technologies include CDMA, GPRS, TDMA, GSM, WIMAX, LTE, and the like. In some embodiments, radio 117 might also facilitate other types of wireless communications including Wi-Fi communications and GIS communications.

Input/output port 118 might take on a variety of forms. Illustrative input/output ports include a USB jack, stereo jack, infrared port, proprietary communications ports, and the like. Input/output components 120 include items such as keyboards, microphones, touch screens, and any other item usable to directly or indirectly input data into mobile device 100. Power supply 122 includes items such as batteries, fuel cells, or any other component that can act as a power source to power mobile device 100.

Figure 2:
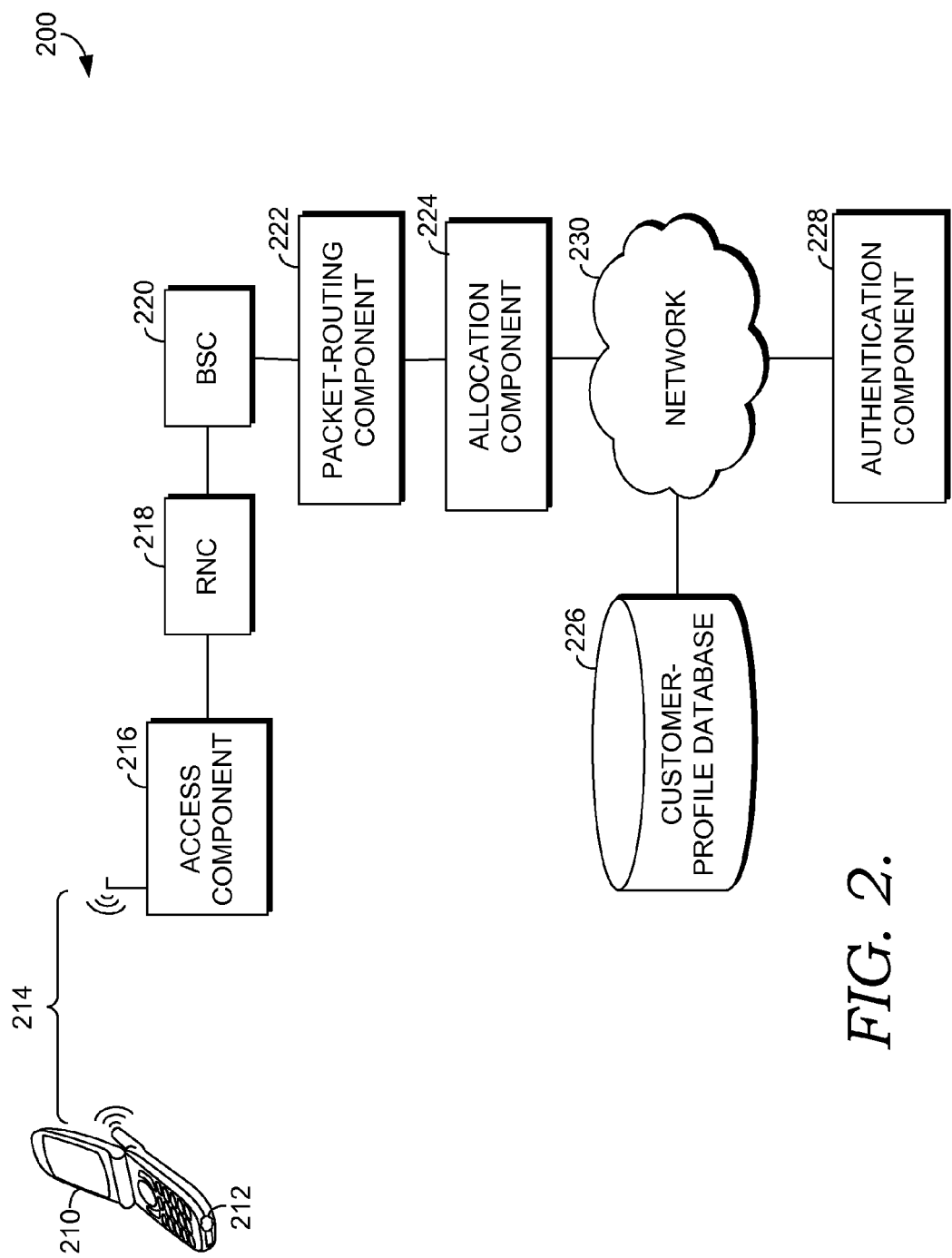
FIG. 2 depicts an illustrative operating system suitable for practicing an embodiment of the present invention.

Turning now to FIG. 2, an illustrative operating environment is provided and referenced generally by the numeral 200, which depicts an illustrative networking environment for managing the allocation of IP addresses to mobile devices. Mobile device 210 is the type of device described in connection with FIG. 1 in one embodiment. It includes a client application 212 that helps carry out aspects of the technology described herein. Whenever we speak of an application, software, or the like, we are really referring to one or more computer-readable media that are embodied with a set of computer-executable instructions that facilitate various actions to be performed. We will not always include this lengthy terminology because doing so would make this document more difficult to read. In one embodiment, the client application 212 communicates requests to establish a communication session with a wireless communications network, which requires an IP address.

Mobile device 210 communicates with an access component 216 by way of a communications link 214. Communications link 214 may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include a WiFi connection to a device (e.g., mobile hotspot) that provides access to a wireless communications network, such as a WLAN connection using 802.11 protocol. A long-range connection may include a connection using one or more of CDMA, GPRS, GSM, TDMA, and 802.16.

Generally, the access component 216 provides access to what some skilled artisans refer to as a wireless communications network, also termed a core network. A wireless communications network may comprise one or more of the components illustrated in FIG. 2. To the contrary, not all components that make up a wireless communications network are shown. Also, not all connections or possible connections are shown. The access component 216 may be one or more of a base transceiver station (BTS) tower, a WiFi Router, a Mobile Hotspot, and any other device that facilitates communication between mobile device 210 and network 230. In one embodiment, the access component 216 includes both a WiFi Router and a BTS tower. In another embodiment, access component 216 is a BTS tower. A radio network controller (RNC) 218 performs various functions, such as managing radio channels, power control, load control, admission control, packet scheduling, handover control, macrodiversity, security functions, and mobility management. A base station controller (BSC) 220 is also shown in FIG. 2. The BSC acts as the intelligence behind base transceiver stations (BTS) (not shown), and handles allocation of radio channels, receives measurements from mobile devices, and controls handovers from one BTS to another BTS.

The components illustrated in FIG. 2, such as those that may be included in a wireless communications network include a packet-routing component 222, an allocation component 224, a customer-profile database 226, and an authentication component 228. As mentioned, other components not shown here may also be used to carry out aspects of the present invention. Further, several components shown in FIG. 2 may be combined into a single component although shown separately in FIG. 2. A packet-routing component 222 may be known to those of ordinary skill in the art as a packet data serving node (PDSN), typically used in CDMA networks, a foreign agent (FA), a Local Mobility Anchor (LMA) used for PMIP functions in the PDSN for IPv6, or a serving GPRS support node (SGSN), typically used in GSM and UMTS networks. Additionally, an Access Service Network (ASN) gateway may be used, and is typically used in WiMAX networks. The packet-routing component 222 acts as the serving point between the radio access and IP networks. It is responsible for managing point-to-point protocol (PPP) sessions between the mobile provider's core IP network 230 and the mobile device 210. At a high level, the packet-routing component 222 helps provide access to the Internet as well as to other network technologies and application services. It helps provide mobile IP (MIP) access, one-agent support, and transportation of packets to facilitate the tunneling or communicating of data through virtual private networks. It can act as a client for an authentication server, such as authentication component 228, which helps ensure that mobile device 210 is authorized to communicate via the wireless communications network.

In one embodiment, a Long Term Evolution radio network may be used, such that the access component 216 is a EUTRAN Node B. The BSC 220 is a Mobility Management Entity. Further, the packet-routing component 222 is a Serving Gateway, the allocation component 224 is a Packet Data Network Gateway (P-GW), and the authentication component 228 is a Home Subscriber Server (HSS).

In one embodiment, the packet-routing component 222 includes a set of computer-executable instructions that helps carry out various aspects of technology described herein. The allocation component 224 is responsible for allocating an IPv6 address, or a portion thereof (e.g., a network portion), to a mobile device 210 that is requesting the establishment of a communication session. Similarly, the allocation component 224 may indicate that the IPv6 address is available when the communication session between the mobile device 210 and the wireless communications network has been terminated so that another mobile device can use that address. The allocation component 224, in one embodiment, is a home agent (e.g., HA, MAG).

The customer-profile database 226 and the authentication component 228 are shown as being outside the boundary of the network 230, but in embodiments of the present invention one or more of these components are actually located within the network 230. The customer-profile database 226 is used to store various attributes associated with mobile devices, such as an identification of the mobile device (e.g., network access identifier (NAI)), an identification of the subscriber of the mobile device, an IP address or a portion of an IP address that is currently being used by the mobile device or that the mobile device has previously used to establish a communication session, usage information, a subscriber's plan information (e.g., voice services, data services, call forwarding), etc. Generally, an IP address is a numerical label that is assigned to devices in a network that use the Internet Protocol for communication between its attached devices. An IP address serves two functions, including to identify the host and network interface and location addressing. In embodiments of the present invention, an IP version six (IPv6) address is allocated to a mobile device. Even further, the IPv6 address allocated to a mobile device in embodiments of the present invention is a dynamic IPv6 address. As used herein, a dynamic IPv6 address is an address that is temporarily assigned to a mobile device each time the mobile device requires the use of an IP address. As such, two separate mobile device users may, at some point, have used the same IP address. Dynamic IPv6 addresses are typically assigned on LANs and broadband networks by servers, such as Dynamic Host Configuration Protocol (DHCP) servers. The use of dynamic IP addresses avoids the burden of assigning specific static addresses to each device on a network. As used herein, the network portion of a static IPv6 address, also termed the prefix portion, is the first 64-bits of the IPv6 address. The network portion of the IP address identifies the network itself. The host portion of the static IPv6 address, also termed the interface portion, is the last 64-bits of the IPv6 address. Generally, the host portion of an IP address is the portion that is used to identify the host on the network.

In embodiments of the present invention, the customer-profile database 226 is accessed to determine whether an IPv6 address or a portion thereof is stored therein. In one embodiment, a mobile device 210 requests the establishment of a communication session, and thus requires an IP address. While both the network and host portions of an IP address are required to establish a communication session, in some cases, the host portion remains constant for a particular mobile device, or may otherwise be known by the mobile device. As such, the mobile device 210, in embodiments, may only be requesting the network portion. In some embodiments of the present invention, such as the embodiment illustrated in FIG. 3, the packet-routing component (e.g., PDSN) is managing or running the DHCP server, and as such, the packet-routing component terminates the DHCP protocol and in turn sends the access-request message and receives the access-accept message. In alternative embodiments, such as that shown in FIG. 4, the allocation component (e.g., home agent) is managing the DHCP server, and thus terminates the DHCP protocol and in turn sends the access-request message and receives the access-accept message.

The authentication component 228, in one embodiment, is an authentication, authorization, and accounting (AAA) server. An AAA server is generally responsible for authorizing a mobile device to perform a given activity, such as logging onto an application or service, authenticating a mobile device on the network, and providing accounting services, such as tracking the consumption of network resources by mobile devices. Here, the authentication component 228, in one embodiment, is responsible for accessing the customer-profile database 226 to determine whether a network portion of an IPv6 address is stored in the customer-profile database 226 in association with the mobile device.

In one instance where the network portion may be stored in the customer-profile database 226, the network portion of the IPv6 address may have previously been communicated to the mobile device 210 from the authentication component 228 prior to communication with the allocation component 224. In another instance where the network portion is stored in the customer-profile database 226, the unique network portion may already have been allocated to the mobile device, such as in relation to a previous communication session, and thus there is no need to query the allocation component 224 again to determine the network portion. Even further, the authentication component 228, without embodiments of the present invention, may have been assigning network portions of IPv6 addresses to mobile devices, which lowers the system impact. In yet another instance, such as in the case of a VPN or special allocation, a certain range of IP addresses (e.g., network portions) for a company, for instance, may have been pre-assigned or pre-allocated. The network portions in this range may then be assigned to the requesting mobile device 210 if the mobile device 210 is authorized to receive one of these addresses. The network knows the range of addresses, but the mobile device 210 does not and thus accepts and uses any address it is given. Therefore in these circumstance, the mobile device 210 still requests an IPv6 address from the network.

Generally, in this disclosure, when we speak of communicating data or information we are referring to any action that requires mobile device 210 to have an IP address in order to carry out some action. Mobile device 210 might attempt to access items such as the Internet as well as other components that might alone or in combination facilitate things such as television reception, e-mail reception, picture mail, video mail, video conferencing, and the like.

Figure 3:
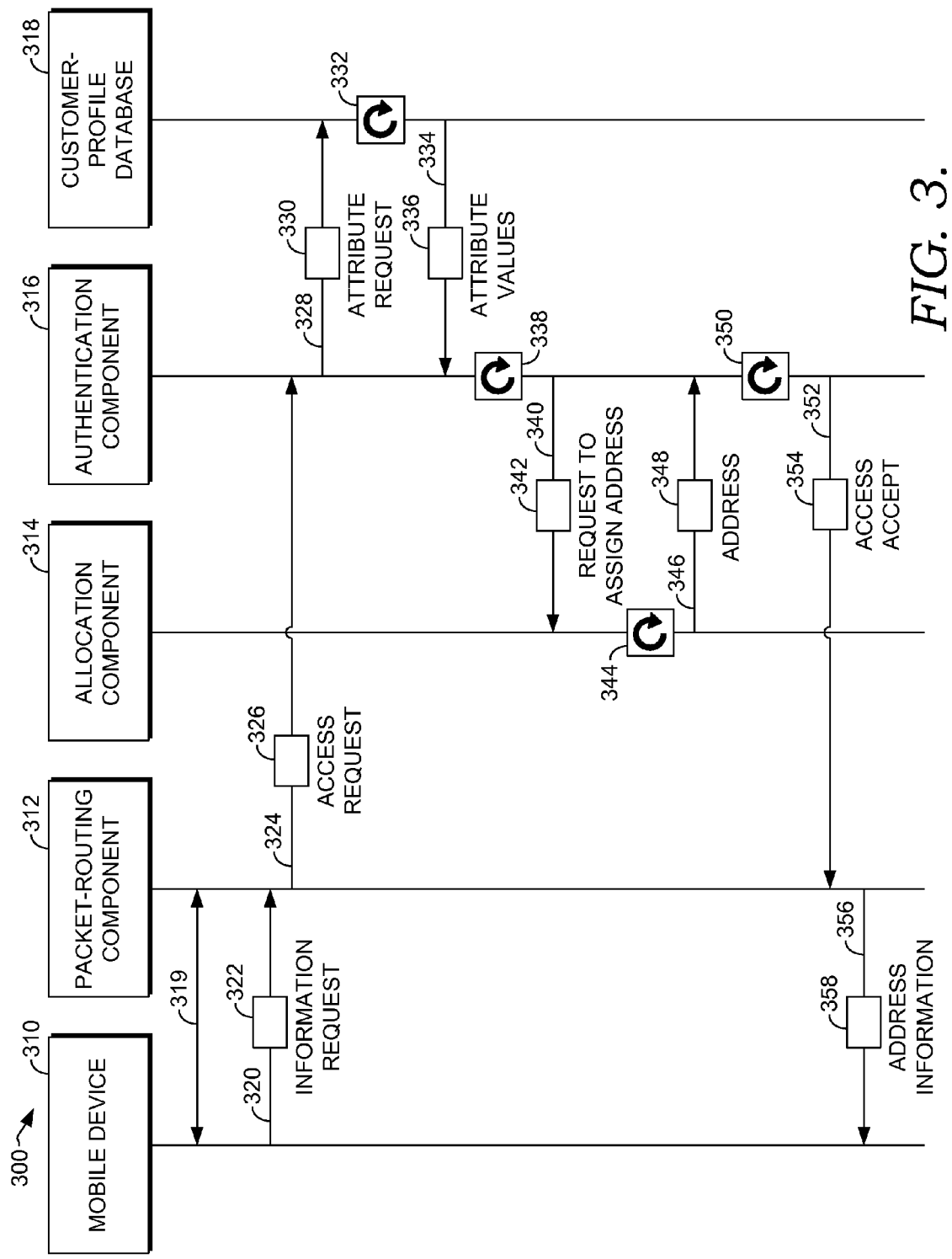
FIG. 3 depicts a flow diagram illustrating a method for allocating a network portion of an IPv6 address to a mobile device, in accordance with an embodiment of the present invention.

Turning now to FIG. 3, a flow diagram is shown illustrating a method 300 for allocating a network portion of an IPv6 address to a mobile device, in accordance with an embodiment of the present invention. Various components are depicted in FIG. 3 and are used to carry out embodiments of the present invention. These components include a mobile device 310, a packet-routing component 312, an allocation component 314, an authentication component 316, and a customer-profile database 318. Generally, each of these components functions as described in relation to FIG. 2. In the embodiment of FIG. 3, the packet-routing component 312 is managing the DHCP server, and thus as seen here, is responsible for communicating access-request messages and receiving access-accept messages. The DHCP server, in some embodiments, may assign IPv6 addresses. Here, the mobile device 310 may request an address from the DHCP server. In the instance where the packet-routing component 312 is managing the DHCP server, then DHCP protocol stops at the packet-routing component 312. The packet-routing component 312 then generates an access-accept message to communicate to the authentication component 316 to determine the IPv6 address.

Initially, the mobile device 310 and the packet-routing component 312 complete the IPv6 control protocol (IPv6CP) configuration and negotiation, as illustrated by the double-arrow line 319. IPv6CP defines the control protocol for establishing and configuring the IPv6 over point-to-point protocol (PPP). A router advertisement is sent to the mobile device 310 so that the mobile device 310 knows that it is to use a certain protocol to obtain the network portion of the IPv6 address. In one embodiment, this protocol is DHCP. The mobile device 310 then communicates 320 an information request 322 to the packet-routing component 312. The information request 322 asks the packet-routing component 312 to find bootstrap information, including domain name system (DNS) server options. The packet-routing component 312 communicates 324 an access request 326 to the authentication component 316. The access request 326 requests from the authentication component 316 various values and attributes, including a network portion of an IPv6 address for the mobile device and an address or identifier corresponding to an allocation component 314 (e.g., home agent) that is associated with the mobile device. For instance, each mobile device may be assigned to a particular allocation component 314, and thus an identification of that allocation component 314 is needed so that the assigned allocation component 314 can be contacted to assign the IP address if needed. Other attributes, in addition to the host portion of the IP address and the allocation component identifier may also be requested by way of the access request 326.

The authentication component 316 communicates 328 an attribute request 330 to a customer-profile database 318 for the requested attribute values. The customer-profile database 318 determines, at step 332, whether it has stored values for these attributes. In one embodiment, each user on the network or for a particular service provider has a user profile that is stored in the customer-profile database 318. The customer-profile database 318, in this embodiment, may access the particular user's profile to determine whether the requested attributes are stored therein. If any of the attributes are found to be stored, the customer-profile database 318 communicates 334 the attribute values 336 to the authentication component 316, which determines whether any attribute values were sent at step 338, in addition to determining which attributes were sent.

If the requested attributes, such as the network portion of the IP address, are stored in the customer-profile database 318, in one embodiment, the network portion is communicated to the mobile device 310 so that the mobile device 310 can use the network portion and a host portion that the mobile device 310 may already have to establish or reestablish a communication session. In another embodiment, rather than the actual network portion being sent to the mobile device 310, an acknowledgment is sent without the network portion indicating that the network portion that the mobile device 310 has previously used is still available and is still allocated to the mobile device 310. In one instance, the customer-profile database 318 has stored the network portion for a particular mobile device if the communication session has gone down (e.g., temporarily terminated) for a short period of time and the IPv6 address is still allocated to that mobile device. For example, the session may have become dormant or may have expired, such as if the user of the mobile device was in an elevator or some other location where the user is unable to communicate with the network (e.g., where there is no service). Here, the mobile device 310 may simply be verifying that the network portion of the IPv6 address is still valid and still allocated to it If, however, the attributes, such as the network portion, are not found to be stored in the customer-profile database 318, the authentication component 316 communicates 340 to the allocation component 314 a request to allocate an IPv6 address 342 to the mobile device 310, and more particularly a network portion of an IPv6 address. While allocation components, such as AAA servers, typically allocate IPv6 addresses, in one embodiment, the allocation component 314 is a home agent and is responsible for allocating network portions of IPv6 addresses to mobile devices and for managing these allocations. At step 344, the allocation component 314 allocates to the mobile device 310 a network portion of an IPv6 address that is not currently being used by another mobile device. Here, the allocation component 314 not only allocates network portions of IPv6 addresses to mobile devices, but the allocation component 314 also manages these allocations such that it monitors which network portions are currently being used, and which are available.

Once allocated, the allocation component 314 communicates 346 the allocated network portion of the IPv6 address 348 to the authentication component 316. In one embodiment, the authentication component 316 stores the network portion that has been allocated to the mobile device 310, shown at step 350. This storage may be a temporary storage, such as a cache so that it can be easily removed when the mobile device 310 is no longer using the network portion. In another embodiment not shown in FIG. 3, the customer-profile database 318 stores the allocated network portion. Here, the authentication component 318 may access the customer-profile database 318 and provide it with the network portion that has been allocated to the mobile device 310 so that it can be stored in the customer-profile database 318. In either case, it is desired that the allocated IPv6 address, or at least the network portion, be stored somewhere in the network so that if a mobile device's communication session is temporarily terminated but soon reestablished, the mobile device can simply send a message to the network to verify that it should use the same previously used IPv6 address from the last communication session.

The authentication component 316 then communicates 352 an access accept 354 to the packet-routing component 312. The access accept 354 provides the packet-routing component 312 with the identification of the allocation component 314, the network portion of the IPv6 address that has been allocated to the mobile device 310, and other attributes that are stored in the customer-profile database 318 or that have been assigned or allocated to the mobile device 310. The packet-routing component 312 then communicates 356 the address information 358 to the mobile device 310. The address information 358 includes the attributes requested in the access request 326, including the identification of the allocation component 314, the network portion of the IPv6 address that has been allocated to the mobile device 310, etc.

Figure 4:
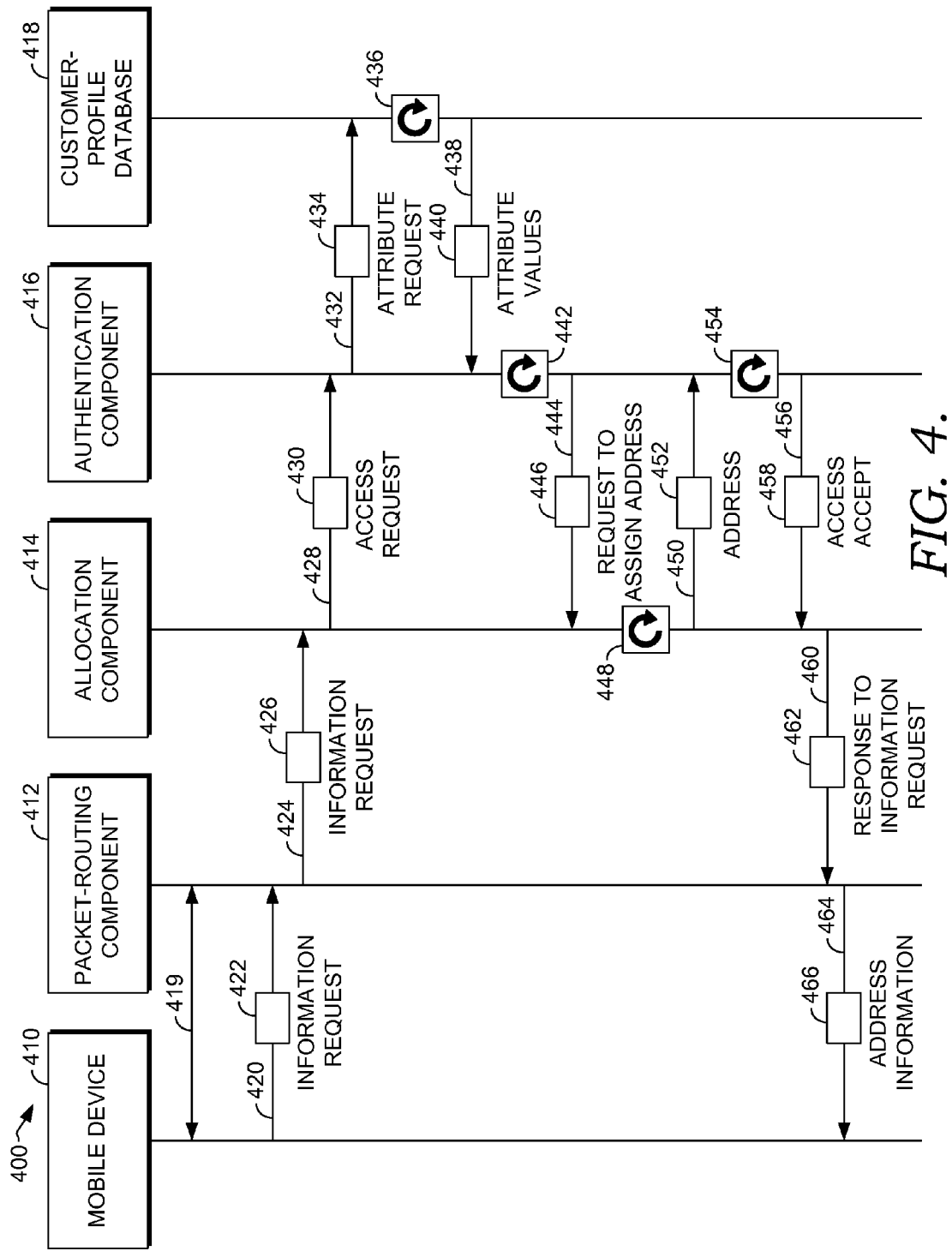
FIG. 4 depicts a flow diagram illustrating another method for allocating a network portion of an IPv6 address to a mobile device, in accordance with an embodiment of the present invention.

Referring to FIG. 4, a flow diagram illustrates another method 400 for allocating a network portion of an IPv6 address to a mobile device, in accordance with an embodiment of the present invention. The components illustrated in FIG. 4 are similar to those in FIG. 3, and include a mobile device 410, a packet-routing component 412, an allocation component 414, an authentication component 416, and a customer-profile database 418. As mentioned above, in the embodiment of FIG. 3, the packet-routing component 312 manages the DHCP server. But in the embodiment of FIG. 4, the allocation component 414 (e.g., home agent) manages the DHCP server. In this case, DHCP messages go all the way to the allocation component 314 and stop there. The allocation component 314 then uses access-accept messages to complete authentication with the authentication component 316. As such, the allocation component 414 communicates and receives the access-request messages and the access-accept messages, respectively.

As illustrated by the double-arrow line 419, the mobile device 410 and the packet-routing component 412 complete the IPv6 control protocol (IPv6CP) configuration and negotiation. IPv6CP defines the control protocol for establishing and configuring the IPv6 over point-to-point protocol (PPP). A router advertisement is sent to the mobile device 410 so that the mobile device 410 knows that it is to use a certain protocol to obtain the network portion of the IPv6 address. In one embodiment, this protocol is DHCP. The mobile device 410 communicates 420 an information request 422 to the packet-routing component 412. The information request 422 is generally a request for bootstrapping information, such as an address or identifier associated with the allocation component 414 that has previously been assigned to the mobile device 410 and a network portion of an IPv6 address that is allocated to the mobile device 410. The information request 422, in one embodiment, also requests information about DNS server options. The information request 426 is communicated 424 from the packet-routing component 412 to the allocation component 414 which, as mentioned runs on the DHCP server in the embodiment illustrated in FIG. 4. The allocation component 414 communicates 428 an access request 430 to the authentication component 416. The access request 430 requests an address or identification of the allocation component that is to allocate an IPv6 address to the mobile device 410 and a network portion of an IPv6 address. An access request, as used herein, is a request for certain attributes that are specified in the request, including an address or identifier of an allocation component that is assigned to allocate IPv6 addresses to the particular mobile device, and a network portion of an IPv6 address that is allocated to the mobile device. The authentication component 416 queries the customer-profile database 418 by communicating 432 an attribute request 434 that allows for a search of the customer-profile database 418 for the attribute values requested by the mobile device 410. Other attribute values may also be requested, even if not specifically requested by the mobile device 410.

The customer-profile database 418 searches for the attribute values at step 436. Attribute values 440, if found, are communicated 438 back to the authentication component 416. The authentication component 416, at step 442, determines whether any attribute values 440 have been sent. In one embodiment, one or more attribute values are stored in the customer-profile database 418 and are included in the attribute values 440 that are communicated to the authentication component 416. For instance, the network portion of an IPv6 address may be found to be stored in the customer-profile database 418 and is communicated to the authentication component 416 and then to the mobile device 410 so that the mobile device 410 can establish a communication session. Alternatively, in another instance, the network portion may not be stored in the customer-profile database 418, and the allocation component 414 may be directed to allocate an IPv6 address, or at least a network portion of an IPv6 address to the mobile device 410. As such, the authentication component 416, instead of allocating the IPv6 address itself, communicates 444 a request to assign an IPv6 address 446 to the allocation component 414. In embodiments of the present invention, the allocation component 414 is better suited to allocate and manage the allocation of IPv6 addresses to mobile devices. The allocation component 414 may be better suited to allocate IPv6 addresses as it can manage distributed pools of IP addresses. The authentication component 416 does not have to store the IP address assigned to each active mobile device, as the allocation component 414 does this already. This allows for IPv6 addresses to be dynamically assigned to mobile devices. Further, the allocation component, in some embodiments maintains information regarding the state of the mobile device, such as whether the communication session is active, inactive, etc.

At step 448, the allocation component 414 identifies a network portion that is not currently allocated to a mobile device and allocates this network portion to the mobile device 410. The allocation component 414 notifies the authentication component 416 as to which network portion has been allocated to the mobile device 410 by communicating 450 the IPv6 address 452 to the authentication component 416. The authentication component 416 stores this address at step 454. In one embodiment, the authentication component 416 stores the allocated IPv6 address, but in another embodiment, the authentication component 416 directs the customer-profile database 418 to store the IPv6 address in the user's profile. The authentication component 416 communicates 456 an access accept 458 to the allocation component 414. The access accept 458 is a response to the access request 430 and indicates that the request for the mobile device 410 to access the network has been accepted. The access accept 458 includes the attributes that have been requested, such as the network portion of the IPv6 address assigned to the mobile device 410 and the identification of the allocation device assigned to the mobile device 410. Other attributes may also be included in the access accept and are contemplated to be within the scope of the present invention, although not specifically mentioned here. The allocation component 414 responds to the packet-routing component 412 by communicating 460 a response to the information request 462 sent by the packet-routing component 412. The packet-routing component 412 communicates 464 address information 466 to the mobile device 410 such that the mobile device is able to establish a communication session with the network.

Figure 5:
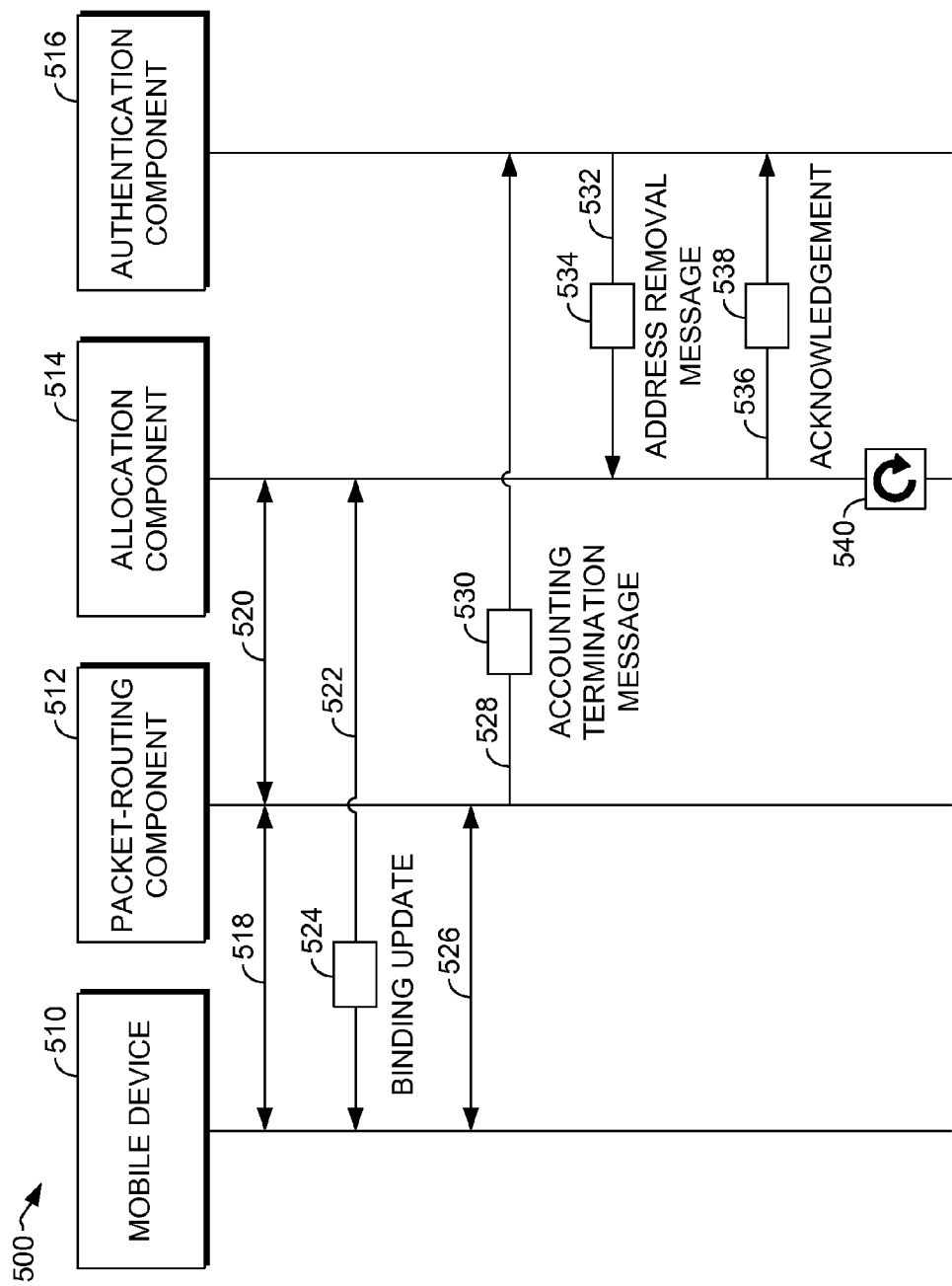
FIG. 5 depicts a flow diagram illustrating a method for terminating a communication session, in accordance with an embodiment of the present invention.

FIG. 5 depicts a flow diagram illustrating a method 500 for terminating a communication session, in accordance with an embodiment of the present invention. Once the mobile device has established a communication session, there are many reasons that the communication session may be terminated. The termination may be intentional or unintentional. For instance, a timer may be used by the network to terminate a session after a certain amount of time that the session has been idle. Or, the mobile device may be in an area of low or no reception. These are examples of unintentional termination. There are various methods that the network may use to complete the process of termination once an indication has been received that the session is to be terminated. While the aging process (e.g., expiration of a timer) typically dictates when the network reallocates the network portion of an IPv6 address or disassociates it from the mobile device that was last using it, in embodiments of the present invention, the network is more proactive. For instance, once billing has terminated or once the network is notified that the communication session has terminated, the network portion of the IPv6 address may be disassociated from the mobile device and reallocated to another mobile device. The advantage of this is that at any given time, there are more available network portions of IPv6 addresses that are available for allocation.

Initially, in the embodiment of FIG. 5, various components are depicted, including a mobile device 510, a packet-routing component 512, an allocation component 514, and an authentication component 516. The communication session is terminated, whereby various communications are sent back and forth between the mobile device 510 and the packet-routing component 512, as indicated by the double-arrow line 518, and between the packet-routing component 512 and the allocation component 514, shown by the double-arrow line 520. The mobile device communicates 522 a binding update 524 to the allocation component 514. The binding update 524 represents the deregistration of the communication session of the mobile device 510 with the network. The lifetime of the binding update 524, in one embodiment, is zero. The termination of IPv6CP via PPP (e.g., layer two connection) is accomplished by various requests and acknowledgments being communicated back and forth between the mobile device 510 and the packet-routing component 512, and is shown by double-arrow line 526. Oftentimes, this back and forth communication is termed a handshake. An accounting termination message 530 is communicated 528 from the packet-routing component 512 to the authentication component 516. This message may be a DIAMETER or RADIUS message and indicates to the authentication component 516 that billing for the particular communication session should be terminated.

The authentication component 516 can now communicate 532 an address-removal message 534 to the allocation component 514. As mentioned, the allocation component 514 is responsible for allocating and managing the allocation of network portions of IPv6 addresses to mobile devices in embodiments of the present invention and thus here is responsible for disassociating the mobile device 510 from the network portion it has used in its previous communication session. The allocation component 514 communicates 536 an acknowledgment 538 to the authentication component 516, and at step 540, disassociates the mobile device 510 from the network portion of the IPv6 address. This network portion is now available for use by another mobile device. In one embodiment, disassociating the network portion from the mobile device comprises the allocation component 514 marking the network portion as being available.

Figure 6:
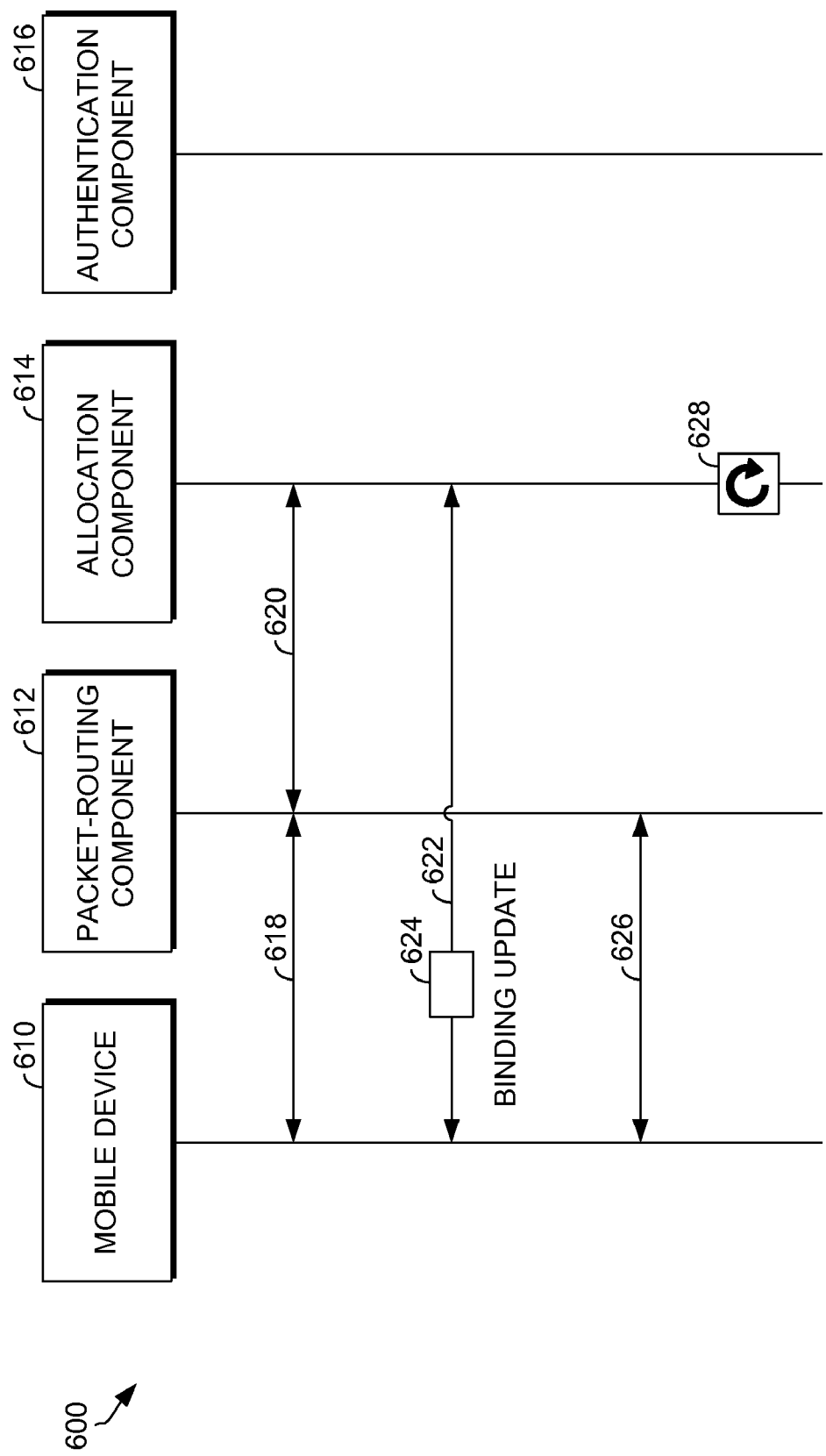
FIG. 6 depicts a flow diagram illustrating a method for terminating a communication session, in accordance with another embodiment of the present invention.

Turning now to FIG. 6, a flow diagram is shown illustrating a method 600 for terminating a communication session, in accordance with another embodiment of the present invention. Here, a mobile device 610, a packet-routing component 612, an allocation component 614, and an authentication component 616 are illustrated. Initially, The communication session is terminated, whereby various communications are sent back and forth between the mobile device 610 and the packet-routing component 612, as indicated by the double-arrow line 618, and between the packet-routing component 612 and the allocation component 614, shown by the double-arrow line 620. The mobile device 610 communicates 622 a binding update 624 to the allocation component 614. The binding update 624 represents the deregistration of the communication session of the mobile device 610 with the network. The lifetime of the binding update 624, in one embodiment, is zero. The termination of IPv6CP via PPP (e.g., layer two connection) is accomplished by various requests and acknowledgments being communicated back and forth between the mobile device 610 and the packet-routing component 612 and is shown by double-arrow line 626. Oftentimes, this back and forth communication is termed a handshake. Unlike the embodiment of FIG. 5, here, the receipt of the binding update 624 by the allocation component 614 triggers the allocation component 614 to disassociate the mobile device 610, shown at step 628, from the network portion of the IPv6 address that the mobile device 610 used for the previous communication session. In one embodiment, the network portion is marked by the allocation component 614 as being available for use by another mobile device.

Figure 7:
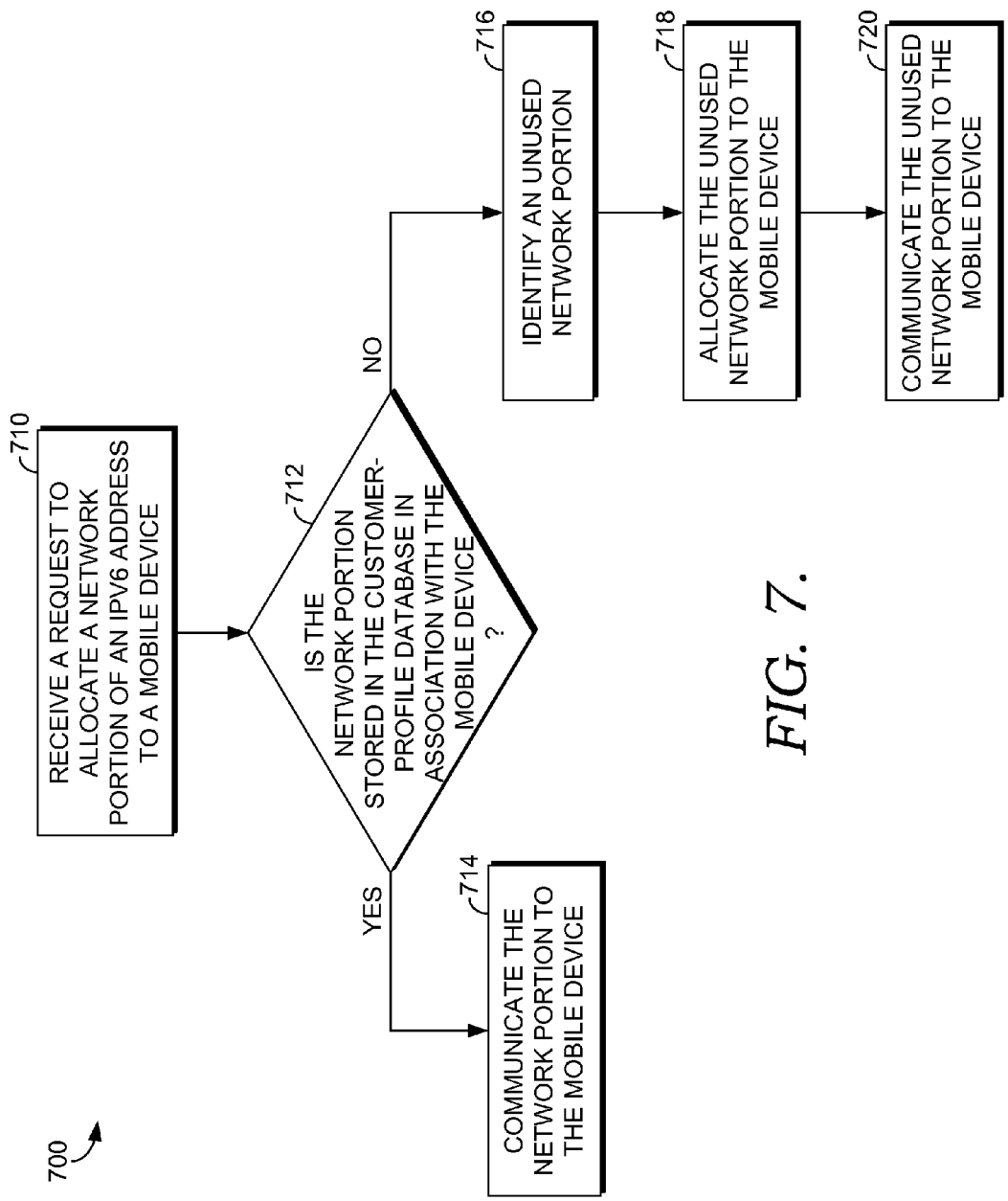
FIGS. 7-9 depict flowcharts of methods for managing the allocation of IPv6 addresses to mobile devices, in accordance with various embodiments of the present invention.

FIG. 7 illustrates a flowchart of a method 700 for managing the allocation of IPv6 addresses to mobile devices. In the embodiment shown in FIG. 7, the allocation component (e.g., home agent) runs the DHCP server. Initially at step 710, a request is received to allocate a network portion of an IPv6 address to a mobile device. In one embodiment, the request is received at an allocation component that is responsible for allocating and managing the allocation of IPv6 addresses to mobile devices. While the term "IPv6 address" is used throughout this disclosure, an IPv6 address may be just the network portion of an IPv6 address, as the host portion of the IPv6 address may not be allocated using the methods described herein. At step 712, it is determined whether a network portion is stored in a customer-profile database in association with the mobile device that has requested the IPv6 address. In one instance, a network portion may be stored in a customer-profile database in association with a mobile device if the mobile device has recently used the network portion for a communication session. The communication session, for example, may have become idle or may have been temporarily terminated due to poor reception. In these and other circumstances, the same network portion may still be allocated to the mobile device so that the mobile device can use the same network portion when a communication session is reestablished. In one embodiment, determining whether a network portion is stored in the customer-profile database comprises communicating a request to an authentication component asking it to query the customer-profile database for the network portion and other attributes associated with the mobile device.

If there is a network portion associated with the mobile device stored in the customer-profile database, this network portion is communicated to the mobile device at step 714. While in some embodiments the mobile device is requesting a network portion even if a previous communication session was recently terminated, in other embodiments, the mobile device may just be requesting a verification that the previously used network portion is still allocated to the mobile device. For the latter, the request communicated by the mobile device may be a little different in that it is asking only for verification, not asking for a network portion of an IPv6 address to be returned. If a network portion associated with the mobile device is not found to be stored in the customer-profile database, an unused network portion is identified at step 716 by the allocation component. The unused network portion is allocated to the mobile device at step 718 and is then communicated to the mobile device at step 720. Allocating the unused network portion may involve associating it with the mobile device and requesting that the authentication component store or cache the association of the network portion and the mobile device. The authentication component may store the association, or may request that the customer-profile database store the association. Once the mobile device has been sent the network portion, a communication session can be established, thereby allowing the mobile device to communicate data and other media with the network.

In an embodiment of the present invention, it may be determined that the communication session has terminated. A communication session may terminate for a number of reasons, including that the session has become idle, a timer associated with the session has expired, the user of the mobile device has actively terminated the session, etc. A removal message may be received from an authentication component directing the allocation component to disassociate the allocated network portion from the mobile device so that the network portion can be allocated to another mobile device. The allocation component, because it manages the allocation of IPv6 addresses, disassociates the allocated network portion from the mobile device so that the allocated network portion is available for use and can be allocated to another mobile device. In an alternate embodiment, once the allocation component has determined that the communication session has been terminated (e.g., by receiving a termination message), the allocation component may immediately disassociate the allocated network portion from the mobile device instead of waiting for a request from the authentication component.

Figure 8:
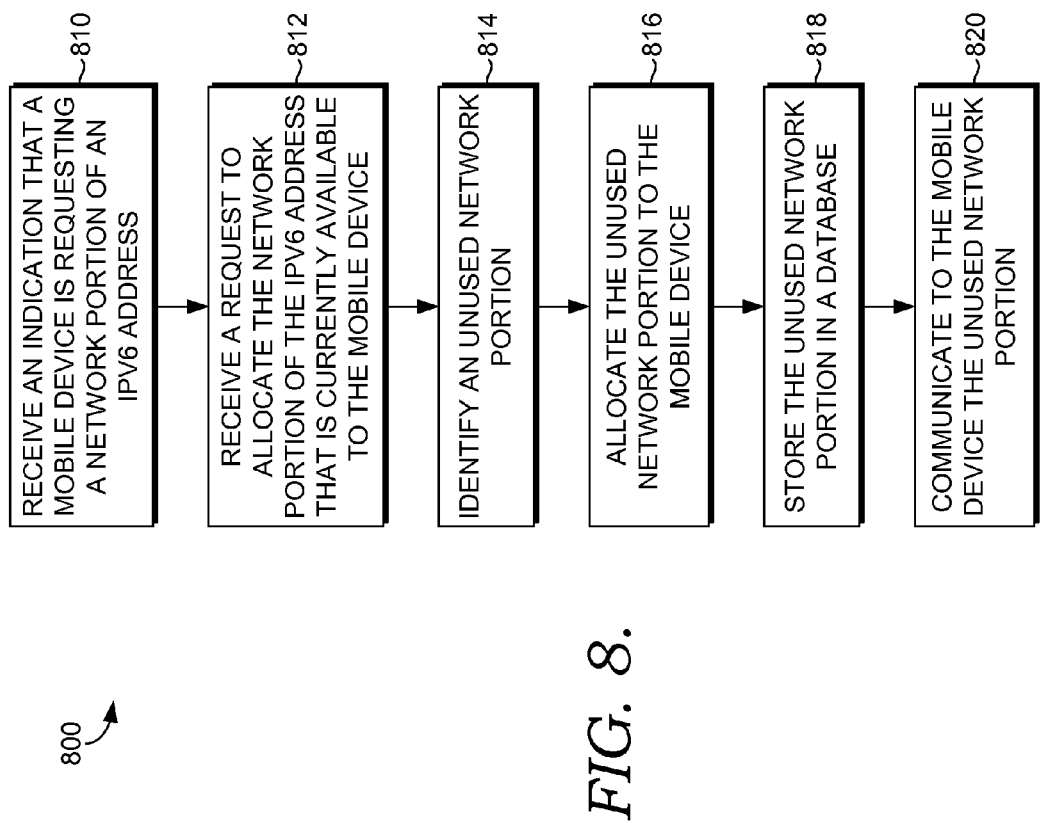

Referring to FIG. 8, a flowchart is shown of another method 800 for managing the allocation of IPv6 addresses to mobile devices. In the embodiment of FIG. 8, the packet-routing component is running on the DHCP server. At step 810, an indication is received that a mobile device is requesting a network portion of an IPv6 address. The IPv6 address enables the mobile device to communicate by way of a wireless communications network. The indication may be received by way of DHCP. A request to allocate a network portion of the IPv6 address that is currently available to the mobile device is received at step 812. In one embodiment, this request is received at an allocation component, such as a home agent. At step 814, an unused network portion is identified, and it is allocated to the mobile device at step 816. The unused network portion is stored in association with the mobile device at step 818. The network portion may be stored in an authentication component, such as an AAA sever, or in a customer-profile database. The network portion is communicated to the mobile device at step 820, which allows the mobile device to communicate by way of a wireless communications network.

In one embodiment, an indication that the communication session has been terminated may be received by the allocation component. Here, the authentication component may communicate a message to the allocation component indicating that the network portion previously used by the mobile device to establish the communication session should now be marked as available. The allocation component disassociates the network portion from the mobile device so that the network portion can be allocated to another device.

Figure 9:
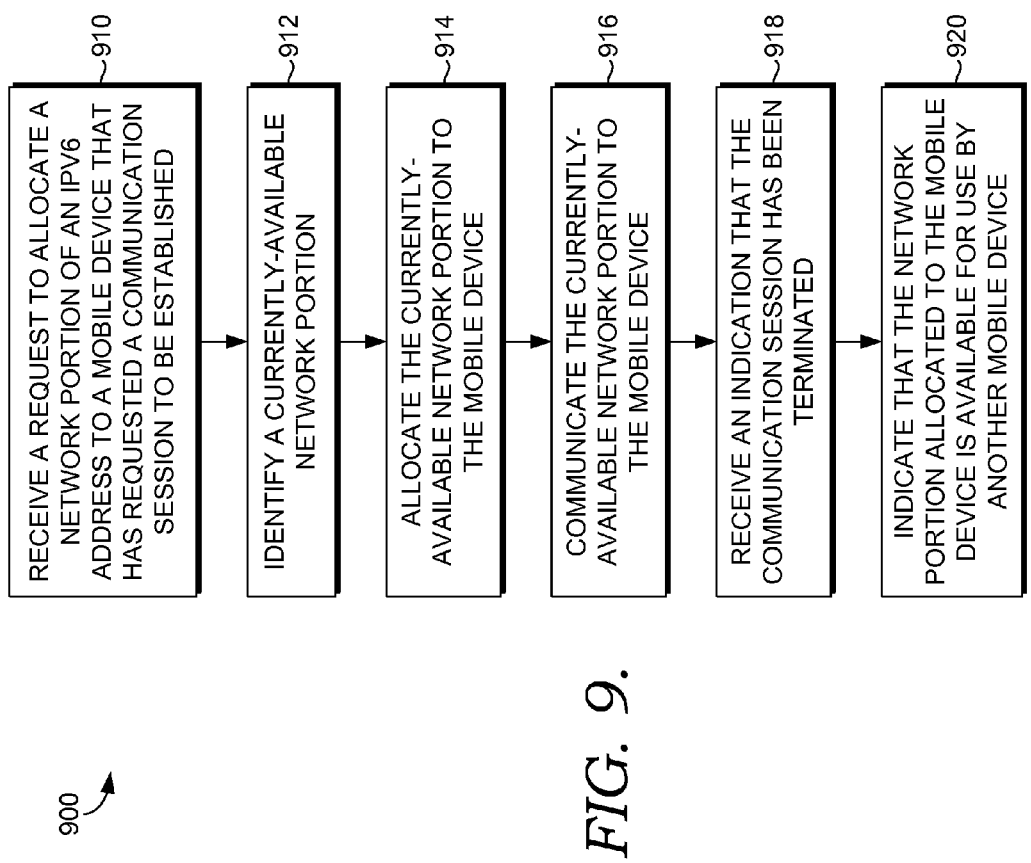

Turning now to FIG. 9, a flowchart is shown of another method 900 for managing the allocation of IPv6 addresses to mobile devices. Initially, a request is received at step 910 to allocate a network portion of an IPv6 address to a mobile device that has requested a communication session to be established. Here, the request indicates that a database, such as a customer-profile database, has been queried that a network portion is not stored in the database in association with the mobile device. In one embodiment, the IPv6 address assigned to the mobile device is dynamically assigned, and thus is a dynamic IPv6 address. At step 912, a currently-available network portion is identified and is allocated to the mobile device at step 914. In one embodiment, the association of the mobile device and the network portion is communicated to the authentication component, which caches the network portion until the termination of the communication session. The currently-available network portion is communicated to the mobile device at step 916. An indication is then received at step 918 that the communication session has been terminated. The allocation component indicates, at step 920, that the network portion previously allocated to the mobile device is now available for use by another mobile device. This may be done by disassociating the network portion and the mobile device. Further, any caches or stores of the association of the mobile device and the network portion may be deleted or released. Additionally, in one embodiment, before indicating that the network portion is available, an instruction may be received from the authentication component instructing the allocation component to disassociate the mobile device from the network portion. The allocation component, in return, may communicate an acknowledgement that the network portion is currently available for use by another mobile device.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims.

The invention claimed is:

1. Non-transitory computer-readable media having computer-executable instructions embodied thereon that, when executed, facilitate a method for managing an allocation of Internet Protocol version six (IPv6) addresses to mobile devices, the method comprising:
   receiving at an allocation component a request to allocate a network portion of an IPv6 address to a mobile device;
   determining whether a customer-profile database has stored the network portion of the IPv6 address in association with the mobile device;
   if the customer-profile database has stored the network portion of the IPv6 address, communicating the network portion to the mobile device;
   if the customer-profile database does not have stored the network portion of the IPv6 address,
   (1) identifying an unused network portion to the mobile device,
   (2) allocating the unused network portion to the mobile device, and
   (3) communicating the unused network portion of the IPv6 address to the mobile device so that the mobile device can establish a communication session;
   instructing a home agent associated with the mobile device to disassociate the allocated unused network portion from the mobile device; and
   receiving an acknowledgement that the allocated unused network portion is currently available for use by another mobile device.

2. The computer-readable media of claim 1, wherein a home agent allocates the unused network portion of the IPv6 address to the mobile device.

3. The computer-readable media of claim 1, wherein the determining comprises communicating a request to an authentication component to query the customer-profile database to determine if the network portion of the IPv6 address is stored therein.

4. The computer-readable media of claim 1, wherein if the customer-profile database has stored the network portion in association with the mobile device, the mobile device has used the network portion to establish a previous communication session.

5. The computer-readable media of claim 1, wherein the allocation component is a home agent.

6. The computer-readable media of claim 1, further comprising associating the unused network portion with the mobile device.

7. The computer-readable media of claim 6, further comprising:
   determining that the communication session has been terminated;
   receiving a removal message from an authentication component directing the allocation component to disassociate the allocated network portion from the mobile device; and
   disassociating the allocated network portion from the mobile device such that the allocated network portion is an available network portion and can be allocated to another mobile device.

8. The computer-readable media of claim 6, further comprising:
   determining that the communication session has been terminated; and
   upon the determination that the communication session has been terminated, disassociating the allocated network portion from the mobile device such that the allocated network portion is an available network portion and can be allocated to another mobile device.

9. The computer-readable media of claim 1, wherein the allocation component is running the Dynamic Host Configuration Protocol (DHCP) server.

10. Non-transitory computer-readable media having computer-executable instructions embodied thereon that, when executed, facilitate a method for managing an allocation of Internet Protocol version six (IPv6) addresses to mobile devices, the method comprising:
   receiving an indication that a mobile device is requesting a network portion of an IPv6 address that enables the mobile device to communicate by way of a wireless communications network;
   at an allocation component, receiving a request to allocate the network portion of the IPv6 address that is currently available to the mobile device;
   identifying an unused network portion to assign to the mobile device;
   allocating, by the allocation component, the unused network portion to the mobile device;
   storing the unused network portion in a database, wherein the unused network portion is stored in association with the mobile device;
   communicating to the mobile device the unused network portion, thereby enabling the mobile device to communicate by way of the wireless communications network;
   receiving an instruction from the authentication component to disassociate the allocated unused network portion from the mobile device; and communicating to the authentication component an acknowledgement that the allocated unused network portion is currently available for use by another mobile device.

11. The computer-readable media of claim 10, wherein the allocation component is a home agent.

12. The computer-readable media of claim 10, wherein storing the unused network portion in a database further comprises communicating the unused network portion to an authentication component that caches the unused network portion in association with the mobile device.

13. The computer-readable media of claim 12, wherein the authentication component is an Authentication, Authorization, and Accounting (AAA) server.

14. The computer-readable media of claim 10, wherein the indication that the mobile device is requesting the network portion of the IPv6 address is received by way of Dynamic Host Configuration Protocol (DHCP).

15. The computer-readable media of claim 10, further comprising:
   receiving a termination indication that a communication session associated with the mobile device has been terminated;
   receiving a message indicating that the allocated network portion should be marked as available; and
   disassociating the allocated network portion from the mobile device so that the allocated network portion can be allocated to another mobile device.

16. Non-transitory computer-readable media having computer-executable instructions embodied thereon that, when executed, facilitate a method for managing an allocation of Internet Protocol version six (IPv6) addresses to mobile devices, the method comprising:
   receiving a request to allocate a network portion of an IPv6 address from an authentication component to a mobile device that has requested an establishment of a communication session, wherein the request indicates that the network portion is not stored in a customer-profile database in association with the mobile device;
   identifying a currently-available network portion;
   at a home agent that is associated with the mobile device, allocating the currently-available network portion to the mobile device, wherein the currently-available network portion allocated to the mobile device is unique to the mobile device;
   communicating the currently-available network portion to the mobile device;
   communicating the currently-available network portion to the authentication component, wherein the authentication component caches the currently-available network portion until the communication session has been terminated;
   receiving an indication that the communication session has been terminated; and
   indicating that the network portion allocated to the mobile device is available for use by another mobile device.

17. The computer-readable media of claim 16, further comprising:
   receiving an instruction from an authentication component to disassociate the allocated network portion from the mobile device; and
   communicating to the authentication component an acknowledgement that the allocated network portion is currently available for use by another mobile device.

18. The computer-readable media of claim 16, wherein the IPv6 address is a dynamic address.

* * * * *